(12) United States Patent
Mellage et al.

(10) Patent No.: US 7,991,433 B2
(45) Date of Patent: Aug. 2, 2011

(54) ELECTRONIC DEVICE ACCESSORY

(75) Inventors: Brian F. Mellage, Raleigh, NC (US);
Curtis W. Thornton, Raleigh, NC (US);
Gerard J. Hayes, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 654 days.

(21) Appl. No.: 11/563,818

(22) Filed: Nov. 28, 2006

(65) Prior Publication Data
US 2008/0123283 A1   May 29, 2008

(51) Int. Cl.
*H04B 1/38* (2006.01)
(52) U.S. Cl. .......................... 455/557; 439/136; 439/916
(58) Field of Classification Search .................... 455/557
See application file for complete search history.

(56) References Cited

U.S. PATENT DOCUMENTS

| | | | |
|---|---|---|---|
| 6,732,113 B1 * | 5/2004 | Ober et al. ............................. | 1/1 |
| 6,758,689 B1 * | 7/2004 | Bair et al. ...................... | 439/136 |
| 6,932,629 B2 * | 8/2005 | Ikenoue ......................... | 439/138 |
| 6,988,659 B2 * | 1/2006 | Fukuda ......................... | 235/441 |
| 7,295,431 B2 * | 11/2007 | Chuang ..................... | 361/679.55 |
| 7,632,113 B2 * | 12/2009 | Finn .............................. | 439/131 |
| 2004/0212966 A1 | 10/2004 | Fisher et al. | |
| 2004/0214601 A1 | 10/2004 | Mok | |

FOREIGN PATENT DOCUMENTS

| | | |
|---|---|---|
| EP | 1367497 | 12/2003 |
| EP | 1703782 | 9/2006 |
| JP | 2003304313 | 10/2003 |
| JP | 2005033359 | 2/2005 |
| JP | 2006229576 | 8/2006 |

OTHER PUBLICATIONS

International Preliminary Report on Patentability from corresponding International Application No. PCT/US07/70076, Nov. 14, 2008.
International Search Report and Written Opinion from corresponding International Application No. PCT/US07/70076, Mar. 4, 2008.

* cited by examiner

*Primary Examiner* — Duc Nguyen
*Assistant Examiner* — Ajibola Akinyemi
(74) *Attorney, Agent, or Firm* — Renner, Otto, Boisselle & Sklar, LLP

(57) ABSTRACT

An electronic device accessory includes a housing containing electronic circuitry. A plug extends from the housing and the plug is configured to connect to a receptacle of the electronic device. A member is attached to the housing and is moveable with respect to the housing so as to physically interfere with connection of the plug with the receptacle of the electronic device.

12 Claims, 2 Drawing Sheets

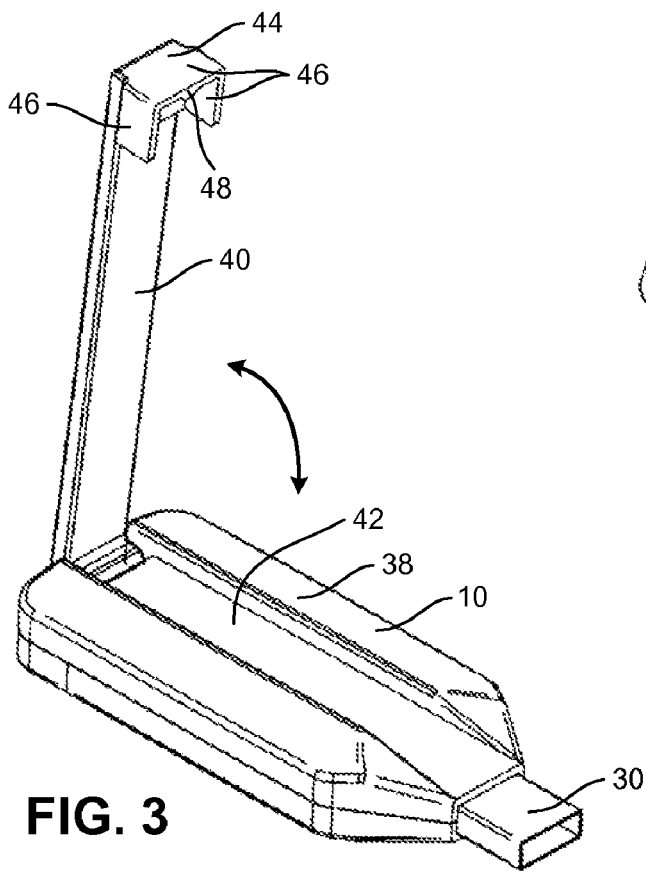
FIG. 3
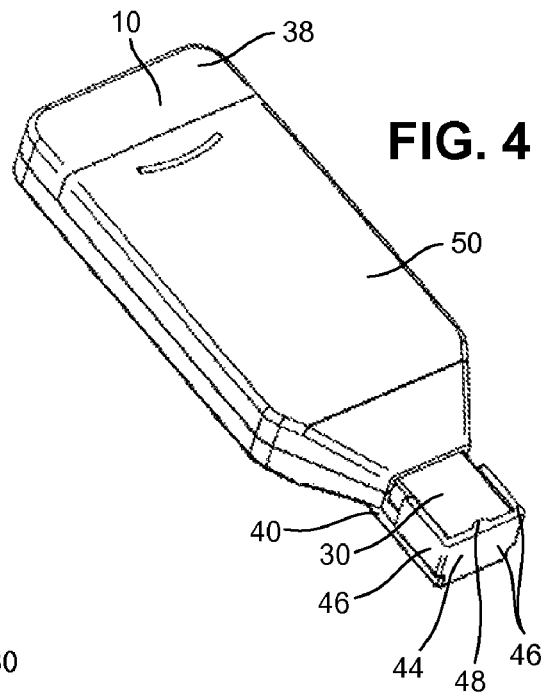
FIG. 4
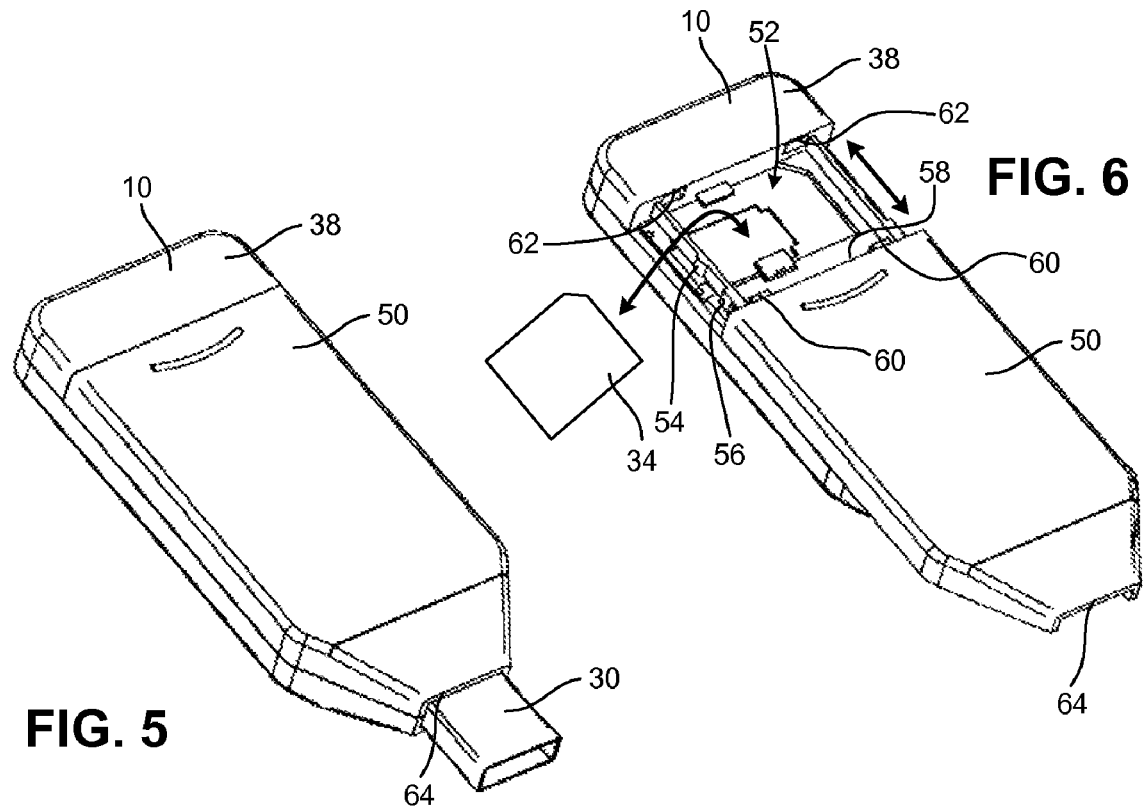
FIG. 5
FIG. 6

ELECTRONIC DEVICE ACCESSORY

TECHNICAL FIELD OF THE INVENTION

The present invention relates generally to accessories for electronic devices, such as a communicator that may be used to establish a communications link between a computer and a communications network. More particularly, the present invention relates to an electronic device accessory that includes a moveable member.

DESCRIPTION OF THE RELATED ART

Many accessories for computers interface to the computer using a connector. For instance, it is common for accessories to have a universal serial bus (USB) plug that mechanically and electrically interfaces with a mating receptacle of the computer. Some accessories have a removable plug cover to cover the plug when the accessory is not in use. The plug cover may reduce the possibility of damage to the plug. Unfortunately, removable covers are subject to becoming lost.

Many USB accessory devices are powered over the USB interface with the USB host device. Some accessories may include a removable component. For instance, a mobile communicator (e.g., a USB modem) may include a subscriber identity module (SIM) card. It is preferable that power not be applied to the SIM card during insertion or removal of the SIM card into or out of the communicator.

SUMMARY

To reduce the possibility of applying power to a removable component of an electronic device accessory during insertion or removal of the removable component, there is a need in the art for an improved electronic device accessory. For instance, one such improved electronic device accessory has a moveable member that interferes with the establishment of an interface with the electronic device when a receptacle for the removable component is accessible by the user. There is also a need in the art for a reliable cover for a plug of an electronic device accessory when the accessory is not in use. In one embodiment, an improved electronic device accessory has an attached moveable member that covers the plug.

According to one aspect of the invention, an electronic device accessory includes a housing containing electronic circuitry; a plug extending from the housing, the plug configured to connect to a receptacle of the electronic device; and a member that is attached to the housing and moveable with respect to the housing so as to physically interfere with connection of the plug with the receptacle of the electronic device.

According to one embodiment, the electronic device accessory further includes a second member that is attached to the housing and moveable with respect to the housing, the second member including at least one of an antenna or a cover for the plug.

According to one embodiment of the electronic device accessory, an interior of the housing is accessible by moving the member to interfere with connection of the plug with the receptacle of the electronic device.

According to one embodiment of the electronic device accessory, the electronic circuitry is configured to interface with a removable electronic component and a receptacle for the removable electronic component is accessible when the member is moved to interfere with connection of the plug with the receptacle of the electronic device.

According to one embodiment of the electronic device accessory, the electronic device accessory includes an antenna and is a communicator for establishing a wireless data connection between the electronic device and a communications network.

According to one embodiment of the electronic device accessory, the electronic circuitry is configured to interface with a removable electronic component.

According to one embodiment of the electronic device accessory, when the removable electronic component is interfaced with the electronic circuitry, the removable electronic component is fully contained in the housing.

According to one embodiment of the electronic device accessory, the removable electronic component is a subscriber identity module (SIM) card.

According to one embodiment of the electronic device accessory, the member is hingably connected to the housing.

According to one embodiment of the electronic device accessory, the member is slidably connected to the housing.

According to one embodiment of the electronic device accessory, the member includes an antenna.

According to one embodiment of the electronic device accessory, the electronic device accessory is a communicator for establishing a wireless data connection between the electronic device and a communications network.

According to one embodiment of the electronic device accessory, the communicator is a universal serial bus (USB) modem.

According to another aspect of the invention, an electronic device accessory includes a housing containing electronic circuitry; a plug extending from the housing, the plug configured to connect to a receptacle of the electronic device; and a member that is attached to the housing and moveable with respect to the housing, the member including an antenna.

According to one embodiment of the electronic device accessory, the member is moveable to a position that covers the plug.

According to one embodiment of the electronic device accessory, the electronic circuitry is configured to interface with a removable electronic component.

According to one embodiment of the electronic device accessory, when the removable electronic component is interfaced with the electronic circuitry, the removable electronic component is fully contained in the housing.

According to one embodiment of the electronic device accessory, the removable electronic component is a subscriber identity module (SIM) card.

According to one embodiment of the electronic device accessory, the electronic device accessory is a communicator for establishing a wireless data connection between the electronic device and a communications network.

According to one embodiment of the electronic device accessory, the communicator is a universal serial bus (USB) modem.

According to yet another aspect of the invention, an electronic device accessory includes a housing containing electronic circuitry; a plug extending from the housing, the plug configured to connect to a receptacle of the electronic device; and a member that is attached to the housing and moveable with respect to the housing between a first position and a second position, the first position allowing an electrical interface between the electronic device and the electronic device accessory and the second position interfering with establishment of the electrical interface between the electronic device and the electronic device accessory.

According to one embodiment of the electronic device accessory, the interference with the establishment of the electrical interface results from physical interaction of the member and the electronic device.

According to one embodiment of the electronic device accessory, the interference with the establishment of the electrical interface results from at least partial disconnection of a supply of power or signals from the electronic circuitry to a removable electronic component of the electronic device accessory.

According to yet another aspect of the invention, an electronic device accessory includes a housing containing electronic circuitry; a plug extending from the housing, the plug configured to connect to a receptacle of the electronic device; and a member that is attached to the housing and moveable with respect to the housing so as to cover the plug.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIG. 3 is a perspective view of an exemplary electronic device accessory in accordance with an embodiment of the present invention having a moveable member disposed in an open position;

FIG. 4 is a perspective view of the electronic device accessory of FIG. 3 with the moveable member disposed in a closed position;

FIG. 5 is a perspective view of an exemplary electronic device accessory in accordance with an embodiment of the present invention having a moveable member disposed in a closed position; and FIG. 6 is a perspective view of the electronic device accessory of FIG. 5 with the moveable member disposed in an open position.

DETAILED DESCRIPTION OF EMBODIMENTS

Figure 1:
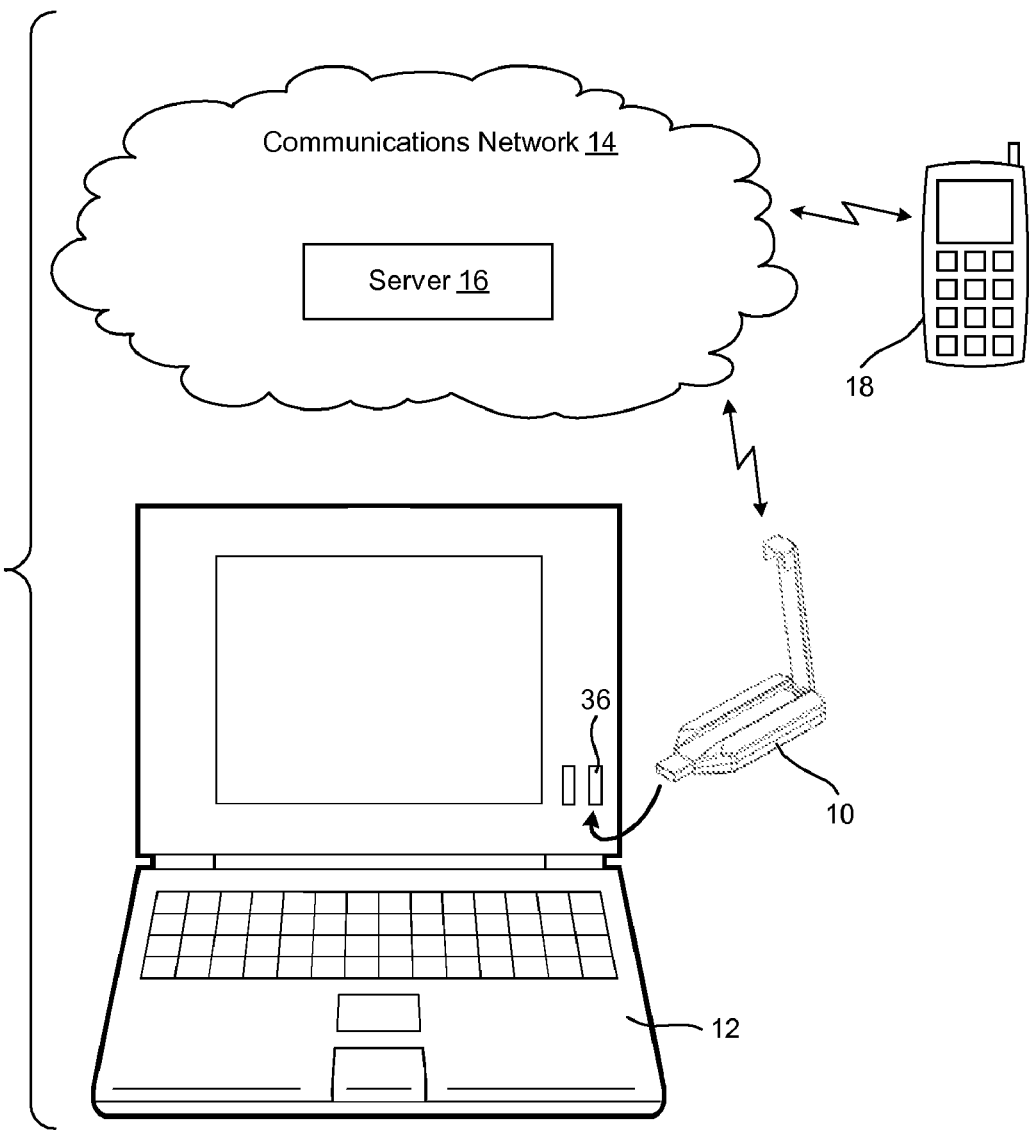
FIG. 1 is a schematic view of a communications system in which an exemplary electronic device accessory may operate.

Embodiments of the present invention will now be described with reference to the drawings, wherein like reference numerals are used to refer to like elements throughout. It will be understood that the figures are not necessarily to scale.

The invention is described primarily in the context of an accessory for an electronic device. The illustrated accessory is a communicator to establish a wireless interface between the electronic device and a communications network. The illustrated electronic device is a computer. It will be appreciated that the accessory is not limited to a communicator and the accessory may be another type of device, such as a memory device, a camera, a mobile telephone, a media player, and so forth. It will be appreciated that the electronic device is not limited to a computer and the electronic device may be another type of device, such as a personal digital assistant (PDA), a gaming device, a vending or banking terminal, and so forth. Accordingly, the invention is not intended to be limited to the exemplary contexts that are illustrated and described herein, but may relate to any type of appropriate electronic equipment. Also, the interchangeable terms "electronic equipment" and "electronic device" include portable radio communication equipment. The term "portable radio communication equipment," which herein after is referred to as a "mobile radio terminal," includes all equipment such as mobile telephones, pagers, communicators, electronic organizers, PDAs, smartphones, portable communication apparatus or the like.

Referring initially to FIG. 1, an exemplary electronic device accessory 10 is shown. The exemplary accessory is configured to mechanically and electronically interface with an electronic device 12. In the illustrated embodiment, the electronic device 12 is a computer and the accessory 10 is a communicator. More particularly, the accessory 10 is a modem to establish a communication link between the electronic device 12 and a communications network 14. In the illustrated embodiment, the communications network 14 includes a server 16 (or servers) that manages calls placed by and destined to one or more mobile telephones 18, manages the transmission of data to and/or from the mobile telephone 18 and carries out any other support functions. The server 16 also may manage communication links established between the accessory 10 and the communications network 14. The communications network 14 may include transmission mediums that communicate with the mobile telephone 18 and/or the accessory 10. The transmission medium may be any appropriate device or assembly, including, for example, a communications tower (e.g., a cell tower), another mobile telephone, a wireless access point, a satellite, etc. As will be appreciated, the server 16 may be configured as a typical computer system used to carry out server functions and may include a processor configured to execute software containing logical instructions that embody the functions of the server 16 and a memory to store such software.

The communications system 14 may be, for example, a cellular circuit-switched network. However, other types of networks or systems are possible. For instance, the system 14 may be a packet-switched network that supports communications with the accessory 10 and/or the mobile telephone 18 using WiFi (e.g., under IEEE Standard 802.11), WiMax (e.g., under IEEE Standard 802.16), etc.

Figure 2:
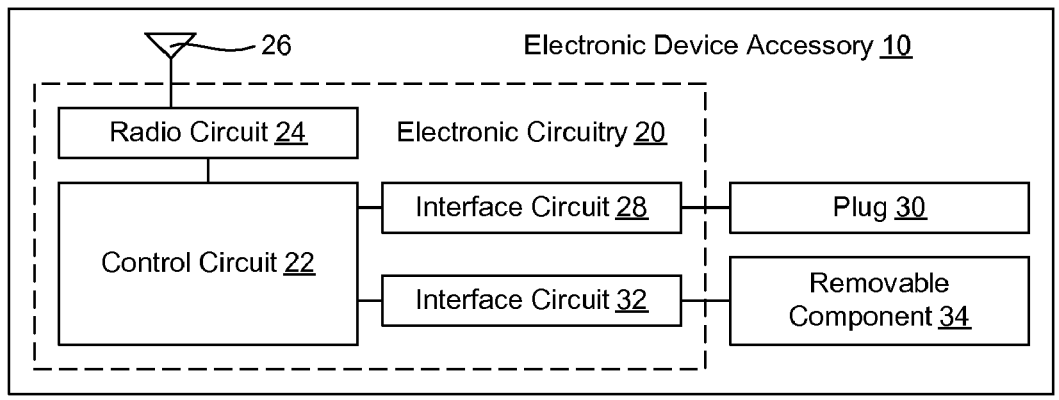
FIG. 2 is a functional block diagram of an exemplary electronic device accessory in accordance with an embodiment of the present invention.

With additional reference to FIG. 2, a functional block diagram of the accessory 10 when configured as the communicator is shown. The accessory 10 may include electronic circuitry 20. The electronic circuitry 20 may include, for example, a primary control circuit 22 that is configured to carry out overall control of the functions and operations of the accessory 10. The control circuit 22 may include a processing device, such as a microcontroller or, in more sophisticated devices, the processing device may be a central processing unit or a microprocessor. The control circuit 22 also may include a memory and any other support circuitry. The control circuit 22 may execute logical instructions (e.g., firmware or code stored that is stored by the memory) in order to carry out operation of the accessory 10. Such functionality could also be carried out via dedicated hardware or a combination of hardware and logical instructions (e.g., firmware and/or software).

The electronic circuitry 20 may further include a radio circuit 24 that is coupled to an antenna 26. For instance, the radio circuit 24 may include a radio frequency transmitter and receiver for exchanging signals with the communications network 14 (or directly with an electronic device) via the antenna 26. As indicated, the radio circuit 24 may be configured to operate in a mobile communications system and may be used to send and receive data (including, for example, audio content to carry out a call and/or video content). Radio circuit types for interaction with a mobile radio network and/or broadcasting network include, but are not limited to, GSM, CDMA, WCDMA, GPRS, MBMS, WiFi, WiMax, DVB-H, ISDB-T, etc., as well as advanced versions of these standards.

The electronic circuitry 20 may further include an interface circuit 28 that couples the control circuit 22 to an electrical connector, which is referred to herein as a plug 30. The plug 30 may be used to establish physical and electrical connection between the accessory 10 and the electronic device 12. In the illustrated embodiments, the plug 30 is a plug constructed in accordance with one or more of the Universal Serial Bus (USB) standards. It will be appreciated that the plug 30 may be another type of connector, such as a connector constructed in accordance with IEEE Standard 1394 (e.g., Firewire), a connector constructed in accordance with some other standard or a proprietary connector. The interface circuit 28 may be an interface controller. For instance, in the embodiment where the plug 30 is a USB plug, the interface circuit 28 may be a USB controller.

The electronic circuitry 20 may further include an interface circuit 32 that couples the control circuit 22 to a removable component 34. In the illustrated example, the removable component 34 is a subscriber identity module (SIM) card. As will be appreciated, a SIM card may include a memory component and may be used to securely store information that identifies a mobile phone service subscriber, as well as subscription information, saved telephone numbers, preferences, text messages and other information. The SIM card may store network state information such as a current location area identity (LAI). The SIM card may be uniquely identified by an international circuit card identifier (ICCID) and may uniquely identify a user with an international mobile subscriber identity (IMSI). Other types of removable components that serve similar purposes may be used. For instance, a universal subscriber identity module (USIM) for use with a universal mobile telecommunications system (UMTS) may be employed.

As indicated, the illustrated accessory 10 is a communicator, and, more specifically, a USB modem with an integrated SIM card holder. When the accessory 10 with the SIM card is "plugged" into a corresponding receptacle 36 (FIG. 1) of the electronic device 12, the electronic device may communicate with the communications network 14 or another device. The resulting communications link may be used to carry out related functions, such as exchanging information, conducting conventional circuit switched calls or packet switched calls (e.g., voice over internet protocol or VoIP calls), accessing the Internet and so forth.

The accessory 10 may be other types of devices and/or may include components to carryout functions in addition to communicator functions. In one embodiment, the accessory 10 may be a memory device where the radio circuit 24 and the antenna 26 are omitted and the removable component is a removable memory card, such as a flash memory card.

With additional reference to FIGS. 3 and 4, the accessory 10 may have a housing 38 from which the plug 30 extends. A movable member 40 may be secured to the housing 38 so that the movable member 40 is not readily removable from the housing 28. The housing 38 and the movable member 40 may be made from a molded polymer material, for example. In the illustrated embodiment, the movable member 40 is hinged to the housing and, in FIG. 3, is shown in an open position. The movable member 40 may be swung to a closed position as shown in FIG. 4. A recess 42 in the housing 38 may accommodate the movable member 40 when the movable member is in the closed position.

In the illustrated embodiment, a distal end of the movable member 40 includes plug cover 44. The plug cover 44 has one or more walls 46 that are perpendicular to the moveable member 40. When the movable member 40 is moved to the closed position, the walls 46 slide over and engage opposing side surfaces of the plug 30 and an open end of the plug 30. In the illustrated embodiment of the plug 30, the plug 30 is configured as a series A USB plug. In such a configuration, the sides of the plug 30 together with a top and a bottom form a cavity in which electrical connectors are positioned. Other types of plugs may have similar cavities and/or open ends. The wall 46 that covers the open end of the plug 30 may reduce the possibility of a foreign object entering the cavity and damaging the plug 30. One or more of the walls 46 may have a detent 48 that snap fits over the plug 30 to assist in retaining the movable member 40 in the closed position. A lifting force may be applied to the movable member 40 to disengage the detent 48 from the plug 30.

As will be appreciated, the cover 44 may cover the plug 30 when the accessory 10 is not in use. The cover 44 is affixed to the housing 38 through the hingably connected movable member 40 to reduce the possibility of the cover 44 becoming lost. Also, the cover 44, when positioned over the plug 30, may physically interfere with establishing a connection between the plug 30 and the receptacle 36.

In one embodiment, the antenna 26 (FIG. 2) may be disposed within the movable member 40. One or more electrical conductors that run through the hinge connection between the movable member 40 and the housing 38 may couple the antenna 26 to the radio circuit 24. In one embodiment, the electrical conductors may be arranged so that electrical connection between the antenna 26 and the radio circuit 24 is established when the movable member 40 is in the open position and so that the electrical connection is disengaged when the movable member 40 is in the closed position. Integrating the antenna 26 with the movable member may improve the wireless communication link with the communications network 14 or another device by allowing the user to move the antenna 26 to optimize the signal strength. In another embodiment, the antenna 26 may be disposed in the housing 38.

With additional reference to FIGS. 5 and 6, the accessory 10 may include another moveable member 50. The movable member 50 may be secured to the housing 38 so that the movable member 50 is not readily removable from the housing 28. It will be understood that the accessory 10 may include just one of the movable members 40 or 50, or both movable members 40 and 50 (e.g., as best shown in FIG. 4). The movable member 50 may be made from a molded polymer material, for example.

The movable member 50 may serve to cover a receptacle 52 for the removable electronic component 34. In the illustrated embodiment, the receptacle 52 is a card holder that mechanically receives a SIM card and establishes an electrical interface thereto. The movable member 50 may move between an open position as shown in FIG. 6 and a closed position as shown in FIGS. 4 and 5. One or more detents 54 may interact with a corresponding structure (e.g., indent or detent) of the movable member 50 to assist in maintaining the movable member 50 in the closed position. Also, one or more detents 56 may interact with a corresponding structure (e.g., indent, detent or a trailing edge 58) of the movable member 50 to assist in maintaining the movable member 50 in the open position. Detents 60 on the trailing edge of the movable member 50 may be received in corresponding indents 62 of the housing and may form a friction, snap or interference fit therewith.

When in the open position, a user may remove and/or insert the removable component 34 with respect to the receptacle 52. When the removable component 34 is inserted into the receptacle 52 and the movable member 50 is closed, the removable component 34 may be considered to be fully contained within the accessory 10.

When in the open position, a forward portion of the movable member 50 may cover the plug 30 as best shown in FIG. 6. In this position of the movable member 50, the plug 30 may not be inserted into the corresponding receptacle 36 unless the movable member 50 is first closed. That is, when the movable member 50 is in the open position so as to provide user access to the receptacle 52, the movable member 50 may physically interfere with insertion of the plug 30 into to receptacle 36.

In addition, when the plug 30 is inserted into the receptacle 36 so as to establish an interface between the accessory 10 and the electronic device 12, user access to the receptacle 52 is minimized. That is, when the movable member 50 is in the closed position, the receptacle 52 is covered and the plug 30 is uncovered to allow insertion of the plug 30 into the receptacle 35. Furthermore, a housing or other structural component of the electronic device surrounding the receptacle 36 will interfere with opening of the movable member 50. In particular, a leading edge 64 of the movable member 50 will engage the electronic device 12 to interfere with opening of the movable member 50.

It will be appreciated that the arrangement of the movable member 50, the plug 30 and the receptacle 52 minimizes the possibility that the user may insert or remove the removable component 34 when the accessory 10 is interfaced with the electronic device 12 and possibly receiving operating power from the electronic device 12. As such, the physical configuration of the accessory 10 reduces the risk of damage to the removable component 34, the accessory 10 and/or the electronic device 12 by insertion or removal of the removable component 34 at an inopportune time.

It will be appreciated that the illustrated and described embodiments are exemplary representations of techniques for covering the plug 30 and/or minimizing removal of the removable component 34 when the plug 30 is inserted into the receptacle 36. Other implementations are possible. The invention is not limited by the illustration and description of exemplary representations. For example, another possible embodiment is to couple a slidable or rotatable movable member with a finger that extends next to the plug 30 or through the cavity of the plug 30. The movable member may selectively cover the receptacle 52 and the finger may create an interference with the electronic device 12 or the receptacle 36 to minimize access to the receptacle 52 when the plug 30 is inserted into the receptacle 36. In another embodiment, the movable member may move in multiple directions or manners. For instance, the movable member may be moved by lifting and sliding the movable member.

In another embodiment, the movable member 50 may not create or cause a mechanical interference between the accessory 10 and the electrical device 12. Rather, movement of the movable member to allow access to the receptacle 52 may result in an electrical disconnection of power and/or signals between the interface circuit 32 (FIG. 2) and the removable component 34. For instance, the movable member 50 may be coupled to a switch that is toggled by movement of the movable member 50. The switch may control the application or power and/or signals to the removable component 34. As another example, the position of the movable member 50 and/or movement of the movable member 50 may be sensed to control the application or power and/or signals to the removable component 34. Position and/or movement sensing may be made by using, for example, a Hall effect sensor and a magnet, or an accelerometer.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. An electronic device accessory, comprising:
   a housing containing electronic circuitry and a receptacle for a removable electronic component;
   a plug extending from the housing, the plug configured to connect to a receptacle of an electronic device; and
   a member that is attached to the housing and moveable with respect to the housing between a first position and a second position, and while in the first position the housing and the member engaging each other to maintain the member in the first position, the first position allowing an electrical interface between the electronic device and the electronic device accessory and the second position physically interfering with establishment of the electrical interface between the electronic device and the electronic device accessory;
   wherein the electronic circuitry is configured to interface with the removable electronic component via the receptacle for the removable electronic component; and
   wherein the receptacle for the removable electronic component is accessible when the member is moved to the second position.

2. The electronic device accessory of claim 1, further comprising a second member that is attached to the housing and moveable with respect to the housing, the second member including at least one of an antenna or a cover for the plug.

3. The electronic device accessory of claim 1, wherein an interior of the housing in which the electronic circuitry and receptacle are disposed is accessible by moving the member to interfere with connection of the plug with the receptacle of the electronic device.

4. The electronic device accessory of claim 1, wherein the electronic device accessory includes an antenna and is a communicator for establishing a wireless data connection between the electronic device and a communications network.

5. The electronic device accessory of claim 1, wherein when the removable electronic component is interfaced with the electronic circuitry, the removable electronic component is fully contained in the housing.

6. The electronic device accessory of claim 1, wherein the removable electronic component is a subscriber identity module (SIM) card.

7. The electronic device accessory of claim 1, wherein the member is hingably connected to the housing.

8. The electronic device accessory of claim 1, wherein the member is slidably connected to the housing.

9. The electronic device accessory of claim 1, wherein the member includes an antenna.

10. The electronic device accessory of claim 9, wherein the electronic device accessory is a communicator for establishing a wireless data connection between the electronic device and a communications network.

11. The electronic device accessory of claim 10, wherein the communicator is a universal serial bus (USB) modem.

12. An electronic device accessory, comprising:
- a housing containing electronic circuitry and a receptacle for a removable electronic component;
- a plug extending from the housing, the plug configured to connect to a receptacle of an electronic device; and
- a member that is attached to the housing and moveable with respect to the housing so as to physically cover the plug;
- wherein the electronic circuitry is configured to interface with the removable electronic component via the receptacle for the removable electronic component; and
- wherein the receptacle for the removable electronic component is accessible when the member is moved from a first position that is closed and locked to cover the receptacle for the removable electronic component to a second position that physically covers the plug.

* * * * *